(12) United States Patent
Olesinski et al.

(10) Patent No.: US 8,145,823 B2
(45) Date of Patent: Mar. 27, 2012

(54) PARALLEL WRAPPED WAVE-FRONT ARBITER

(75) Inventors: Wladyslaw Olesinski, Sunnyvale, CA (US); Hans Eberle, Sunnyvale, CA (US); Nils Gura, Mountain View, CA (US)

(73) Assignee: Oracle America, Inc., Redwood Shores, CA (US)

( * ) Notice: Subject to any disclaimer, the term of this patent is extended or adjusted under 35 U.S.C. 154(b) by 958 days.

(21) Appl. No.: 11/731,590

(22) Filed: Mar. 29, 2007

(65) Prior Publication Data

US 2008/0107021 A1 May 8, 2008

Related U.S. Application Data

(60) Provisional application No. 60/857,319, filed on Nov. 6, 2006.

(51) Int. Cl.
*G06F 13/00* (2006.01)
(52) U.S. Cl. ......... 710/316; 710/113; 710/241; 710/317
(58) Field of Classification Search .................. 710/113, 710/241, 316, 317; 370/395.4, 422
See application file for complete search history.

(56) References Cited

U.S. PATENT DOCUMENTS

| | | | |
|---|---|---|---|
| 6,735,212 B1 * | 5/2004 | Calamvokis | 370/412 |
| 6,856,622 B1 * | 2/2005 | Calamvokis et al. | 370/390 |
| 7,006,513 B1 * | 2/2006 | Ali et al. | 370/414 |
| 7,274,701 B2 * | 9/2007 | Boduch et al. | 370/395.4 |
| 7,426,216 B2 * | 9/2008 | Yang et al. | 370/423 |
| 2004/0085967 A1 * | 5/2004 | Boduch et al. | 370/395.42 |
| 2004/0165598 A1 * | 8/2004 | Shrimali et al. | 370/395.42 |

OTHER PUBLICATIONS

Publication: Mora et al. entitled "*Towards an Efficient Switch Architecture for High-Radix Switches*", ANCS Dec. 3-5, 2006, San Jose, CA, ACM 0-59593-580-0/06/0012.
Publication: Eiji Oki et al., entitled "*A Pipeline-Based Approach for Maximal-Sized Matching Scheduling in Input-Buffered Switches*", ICEE communications letters, vol. 5, No. 6, Jun. 2001, pp. 263 to 265.
Publication: Thomas E. Anderson, "*Highspeed Switch Scheduling for Local Area Networks*", Digital Equipment Corporation Systems Research Center, 130 Lytton Avenue, Palo Alto, CA 94301, pp. 1 to 13.
Publication: Isaac Keslassy et al., *Scaling Internet Routers Using Optics* (*Extended Version*), Stanford HPNG Technical Report TR03-HPNG-080101, pp. 1 to 16.

(Continued)

*Primary Examiner* — Mark Rinehart
*Assistant Examiner* — Nimesh G Patel
(74) *Attorney, Agent, or Firm* — Park, Vaughan, Fleming & Dowler LLP; Anthony Jones

(57) ABSTRACT

Embodiments of the present invention provide a system that schedules the transfer of cells in a switch. The system starts by receiving a set of cells to be transferred from a set of inputs of the switch to a set of outputs of the switch. The system includes S subschedulers, wherein each subscheduler processes N scheduling waves in sequence to generate a conflict-free transfer schedule for a given time slot for a matrix of transfer elements in the switch. The system then operates the subschedulers in parallel to generate S transfer schedules to transfer the cells from the set of inputs of the switch to the set of outputs of the switch during S time slots.

24 Claims, 11 Drawing Sheets

OTHER PUBLICATIONS

Publication: Nick McKeown, *"The iSLIP Scheduling Algorithm for Input-Queued Switches"*, IEEE/ACM transactions on networking, vol. 7, No. 2, Apr. 1999, pp. 188 to 201.

Publication: Manolis Katevenis et al., *"Variable Packet Size Buffered Crossbar (CICQ) Switches"*, IEEE Int. Conference on Communications (ICC 2004) Paris, France Jun. 20-24, 2004, pp. 1 to 7.

Publication: Yuval Tamir et al., *"Symmetric Crossbar Arbiters for VLSI Communication Switches"*, IEEE Transactions on Parallel and Distributed Systems, vol. 4, No. 1, 1993, pp. 13 to 27.

Publication: Robert J. Drost et al., *"Proximity Communication"*, IEEE Journal of Solid-State Circuits, vol. 39, No. 9, Sep. 2004, pp. 1529 to 1535.

\* cited by examiner

PARALLEL WRAPPED WAVE-FRONT ARBITER

RELATED APPLICATIONS

This application hereby claims priority under 35 U.S.C. §119(e) to U.S. Provisional Application Ser. No. 60/857,319, filed on 6 Nov. 2006, the contents of which are herein incorporated by reference.

The subject matter of this application is related to the subject matter in a co-pending non-provisional application by the same inventors as the instant application entitled "Multi-Chip Proximity Communication Switch," having Ser. No. 11/731,672 and filing date 30 Mar. 2007.

BACKGROUND

1. Field of the Invention

Embodiments of the present invention relate to schedulers in computer systems. More specifically, embodiments of the present invention relate to the design of a parallel wrapped wave-front arbiter.

2. Related Art

One of the main challenges in designing a large switch is to design a scheduler that provides an efficient matching between input and output ports in every "slot," where slot is defined as the ratio of the cell size to the line rate (i.e., the transmission time of a cell). As line rates continue to increase and cell sizes remain constant, the slot size (cell time) decreases. As a result, the scheduler has less time to produce the matching for cells arriving on multiple ports. Calculating a schedule for a switch with a large number of ports is further complicated because the computation time grows with the number of ports.

Some schedulers, such as: the PIM scheduler (described by T. Anderson, S. Owicki, J. Saxe, and C. Thacker in "*High Speed Switch Scheduling for Local Area Networks*," ACM Trans. Comput. Syst., vol. 11, no. 4, pp. 319-352, November 1993), the iSLIP scheduler (described by N. McKeown in "*The iSlip Scheduling Algorithm for Input-Queued Switches*," IEEE/ACM Transaction on Networking, vol. 7, no. 2, April 1993), or the DRRM scheduler (described by H. J. Chao and J. S. Park, "*Centralized Contention Resolution Schemes for a Large-Capacity Optical ATM Switch*," Proc. IEEE ATM Workshop '97, Fairfax, Va., May 1998), find the maximal matching by iterative, input/output round-robin arbitration. In each iteration, inputs send access request messages to outputs. The scheduler then grants the requests so that collisions are avoided. Inputs and outputs that are not scheduled in a given iteration get another chance in the next iteration.

In a large switch that supports multi-terabit-per-second throughput, schedulers that use iterative algorithms do not provide sufficient performance. Such schedulers require multiple exchanges of requests and grants, and the bandwidth and time overhead they incur in doing so is simply too large to support high data rates.

Some switch designers have proposed dealing with this problem by pipelining the iterative schemes. For example, the systems described in C. Minkenberg, I. Iliadis and F. Abel, "*Low-Latency Pipelined Crossbar Arbitration*," IEEE Global Telecommunications Conference 2004 (GLOBECOM '04), vol. 2, pp. 1174-1179, November 2004 and E. Oki, R. Rojas-Cessa, and H. J. Chao, "*A Pipeline-Based Maximal-Sized Matching Scheme for High-Speed Input-Buffered Switches*," IEICE Transactions on Communications, vol. E85-B, no. 7, pp. 1302-1311, July 2002 (hereinafter [Rojas]), are two examples of such pipelined schemes. In these pipelined schemes, a given scheduler includes a number of sub-schedulers that process several sets of cells concurrently such that in every slot, one of the sub-schedulers produces a match. If a switch is sufficiently large, though, these schemes require many sub-schedulers, which increases latency, and makes the decision about which sub-scheduler is going to consider a particular request difficult to make.

Other switch designers have proposed using centralized arbiters. One example of a centralized arbiter is the Wrapped Wave Front Arbiter (WWFA) described by Y. Tamir and H. C. Chi, "*Symmetric Crossbar Arbiters for VLSI Communication Switches*," IEEE Transactions on Parallel and Distributed Systems, vol. 4, issue 1, pp. 13-27, January 1993 (hereinafter [Tamir]). Although the WWFA achieves arbiter centralization, the WWFA does not scale well for large switches. For example, assume a 5 Tbps switch with 512 10 Gbps ports and a cell size of 128 bits (i.e., number of ports "N"=512, cell size "L"=128 bits, and line rate "C"=10 Gbps). The scheduling period for a WWFA is NT (where T is the amount of time required to process a "wave" within the WWFA). Since at least one schedule has to be calculated in every slot, NT must be no greater than L/C. This means that $T \leq L/(NC)=0.2$ ns. In other words, the arbiter must process one "wave" that includes N requests in no more than 0.2 ns. This is a problem because a reasonable hardware implementation of transfer elements based on 90 nm technology would require at least T=2 ns per wave. Therefore, the WWFA is unsuitable for a switch of this size.

Hence, what is needed is a switch without the above-described problems.

SUMMARY

Embodiments of the present invention provide a system that schedules the transfer of cells in a switch. The system starts by receiving a set of cells to be transferred from a set of inputs of the switch to a set of outputs of the switch. The system includes S subschedulers, wherein each subscheduler processes N scheduling waves to generate a conflict-free transfer schedule for a given time slot for a matrix of transfer elements in the switch. The system then operates the subschedulers in parallel to generate S transfer schedules to transfer the cells from the set of inputs of the switch to the set of outputs of the switch during S time slots.

In some embodiments, in the matrix of transfer elements each transfer element controls the coupling of one individual input from the set of inputs to one individual output from the set of outputs.

In some embodiments, each scheduling wave includes a subset of the matrix of transfer elements for which simultaneous conflict-free input-to-output transfers can be scheduled.

In some embodiments, when generating the transfer schedules, the system starts each subscheduler from a different scheduling wave among the N scheduling waves.

In some embodiments, each transfer element is coupled to a separate virtual output queue (VOQ), wherein the system stores cells in the VOQ before transferring the cells to the corresponding output.

In some embodiments, each transfer element includes a counter value associated with the corresponding VOQ. As a cell is stored in the VOQ, the system increments the counter value. As a transfer is scheduled from the VOQ to the corresponding output, the system decrements the counter value. The system schedules a transfer from the VOQ to the corresponding output only if the counter value is non-zero.

In some embodiments, each transfer element includes a separate set of two or more priority VOQs, wherein the system stores cells in a selected priority VOQ according to a priority indicated by the cell before transferring the cells to the corresponding output.

In some embodiments, each transfer element includes a counter value associated with each of the corresponding priority VOQs. As a cell is stored in a priority VOQ, the system increments the corresponding counter value. As a transfer is scheduled from a priority VOQ to the corresponding output, the system decrements the corresponding counter value. The system schedules a transfer from a priority VOQ to the corresponding output only if the corresponding counter value is non-zero.

In some embodiments, the system preferentially schedules transfers to the corresponding output from a higher-priority priority VOQ.

In some embodiments, for each transfer schedule in the S transfer schedules, the system performs a set of input-to-output transfers for one time slot using the transfer schedule. The system can use the transfer schedules in any order.

In some embodiments, the number of subschedulers S is equal to or less than the number of scheduling waves N.

In some embodiments, the subschedulers process the N scheduling waves in any order.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Parallel Wrapped Wave Front Arbiter

Embodiments of the present invention provide a Parallel Wrapped Wave Front Arbiter (PWWFA)—an efficient, practical, centralized arbiter applicable for very large switches. This arbiter includes a matrix of elements that maintain and process requests for outputs. With several "waves" of processing performed concurrently, the arbiter can schedule multiple slots simultaneously. Note that this scheduling happens without the usual overhead associated with iterative schemes.

We focus on a switch that has N input and N output ports. (Note that we illustrate embodiments of the present invention using an exemplary 5 Tbps switch with 512 10 Gbps ports.) We assume that every input port has N Virtual Output Queues (VOQs). Each VOQ stores cells destined for one of the N output ports. In every slot, the arbiter selects up to N cells, one from each input port, and matches them with the output ports. In a single slot, an input port can send at most one cell, and an output port can receive at most one cell.

Although we use a switch to describe the PWWFA, in some embodiments, the PWWFA is used for other types of scheduling in a computer system. For example, the PWWFA can be used to schedule the allocation of resources in the computer system, such as scheduling bus transfers, the use of processing resources, or the use of peripheral resources.

Wrapped Wave Front Arbiter

Figure 1:
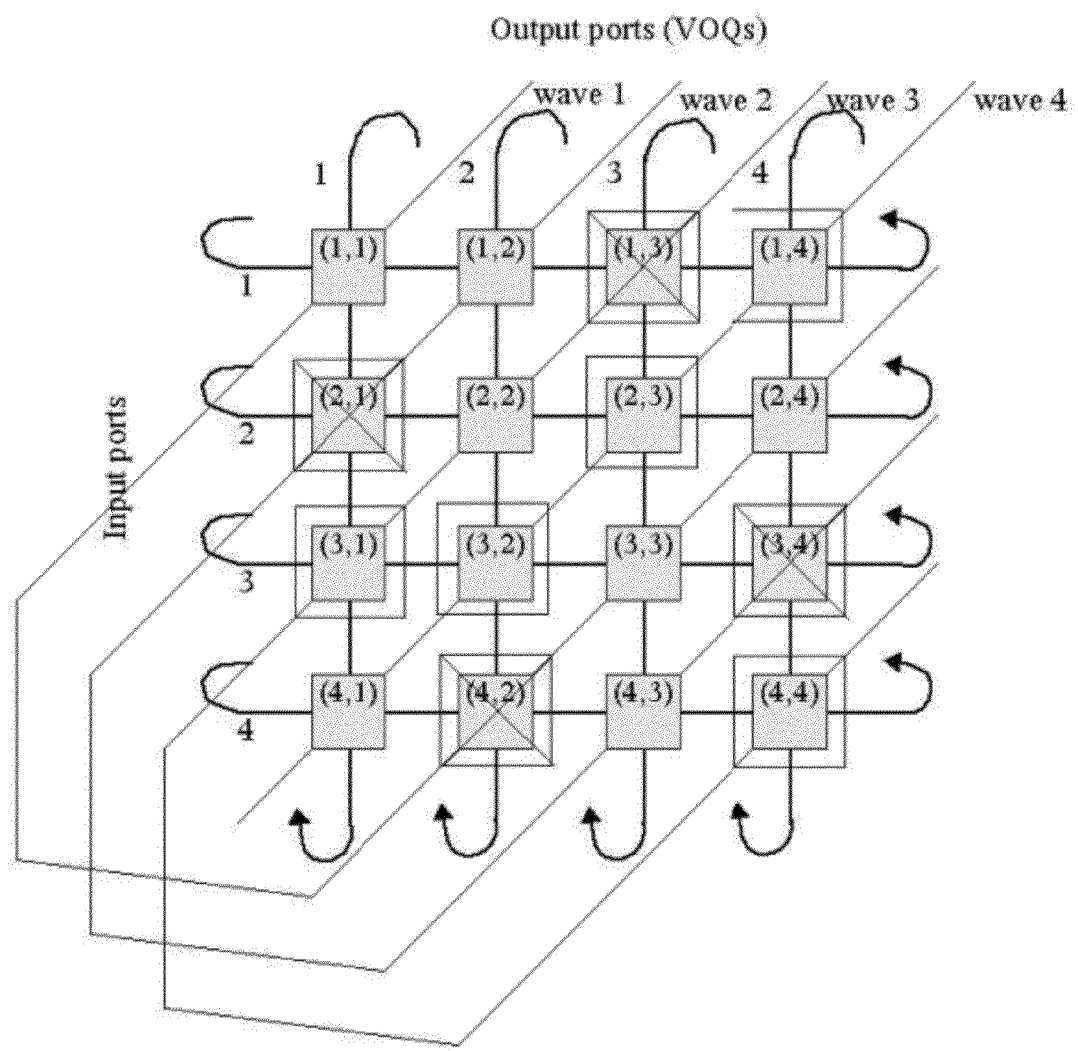
FIG. 1 illustrates the logical structure of a WWFA arbiter for a N=4 switch.

For the purposes of illustration, we describe a conventional WWFA [Tamir] and then extend this scheme to a PWWFA that uses N, as well as S<N subschedulers. FIG. 1 illustrates the logical structure of a WWFA arbiter for a N=4 switch. Each element of this structure represents one VOQ. In FIG. 1, rows correspond to input ports, and columns correspond to VOQs (i.e., output ports). For example, element (2,1) represents VOQ 1 at input port 2.

Each element contains a register $R_{sd}$ which is set to 1 if input port s requests output port d and is set to 0 otherwise.

We can distinguish N "waves" in this structure. Each wave comprises a set of N conflict-free requests. For example, wave 1 in FIG. 1 includes elements (1,1), (4,2), (3,3), and (2,4). Since there is no conflict between these elements, the arbiter can process all requests in these elements at the same time. After processing N waves starting from wave 1 and proceeding to wave N, a schedule for one slot is calculated.

The arbiter grants a request of element (s,d) if the following holds: (1) $R_{sd}>0$, that is, input port s requests output port d; and (2) no grant was issued in row s or column d in any of the preceding waves.

When the request is granted, register $R_{sd}$ is decremented. When a new cell arrives to VOQ d at input port s (denoted by $VOQ_{ds}$), register $R_{sd}$ is incremented. Changes of $R_{sd}$ can occur at any time. Note that in the WWFA, the register can be incremented only up to 1. In contrast, in the PWWFA, as explained below, this counter represents VOQ occupancy and can assume any positive value up to the size of the VOQ.

The "preceding wave" is understood here to mean any wave processed by the scheduler before the current wave to schedule a given slot. For example as shown in FIG. 1, wave 1 precedes waves 2, 3, and 4. These waves are processed together in order to calculate the schedule for a given slot. Under the second condition above, for example, if request in element (1,1) received a grant in the 1st wave, then requests in elements belonging to row 1 and column 1 cannot be granted during the processing of the subsequent three waves. Note that although the waves are processed together to generate a schedule for a given slot, the waves may be processed in any order (e.g., processing wave 1, followed by wave 3, then wave 2, and finally wave 4).

An example of a schedule is shown in FIG. 1, wherein double squares represent requests, and crossed double squares (such as square (2,1)) represent requests that were granted.

Note that the WWFA uses circular shift registers for each row. After the arbiter processes N waves and produces a schedule, the row shift registers are advanced by one element. This way, the arbiter assures that each VOQ has a chance to be assigned highest priority and periodically is served first. In some embodiments of the present invention, in order to provide fairness, the PWWFA starts a given subscheduler on a different wave in each scheduling cycle. For example, if the subscheduler started with wave 1 in the scheduling cycle x, in scheduling cycle x+1, the subscheduler can start with wave 2 or wave 3.

Parallel Wrapped Wave Front Arbiter with S=N Subschedulers

If processing one wave takes time T, then the WWFA produces one schedule after time NT. In embodiments of the present invention, the PWWFA significantly increases the number of schedules calculated.

Embodiments of the present invention include a number of subschedulers that concurrently process different waves of the PWWFA matrix. The rules for deciding if a request is granted or not are the same as the rules described above, with one difference concerning rule (2): a subscheduler issues a grant if no grant was issued in row s or column d in any of the preceding waves processed by the same subscheduler.

Figure 2:
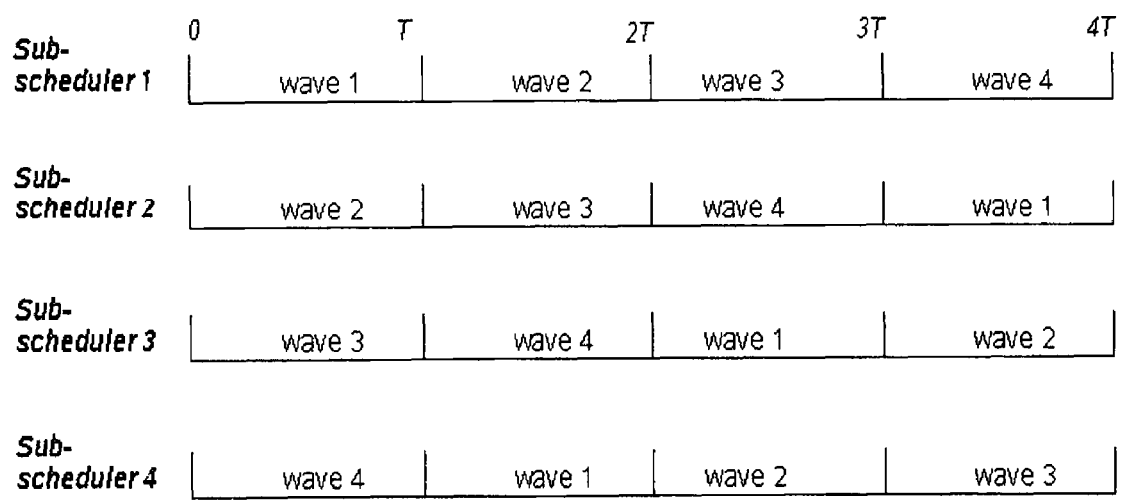
FIG. 2 illustrates a wave-based scheduling scheme for a parallel wrapped wave front arbiter in accordance with embodiments of the present invention.

Embodiments of the present invention employ up to S=N independent subschedulers, which process in parallel their own sequences of waves (for clarity of exposition, assume that there are exactly N subschedulers; a discussion for less than N subschedulers follows below). FIG. 2 illustrates a processing sequence using the waves from FIG. 1 in accordance with embodiments of the present invention. More specifically, FIG. 2 shows which waves the subschedulers process, and when they process them with relation to each other.

In the PWWFA, $R_{sd}$ represents a counter, which is equal to the occupancy of $VOQ_{ds}$. During operation, the subschedulers simultaneously process different waves. Hence, at any given time the arbiter is considering a different set of input port and output port combinations (e.g., while processing wave 1 in FIG. 1, the PWWFA processes transfer elements (1,1), (2,4), (3,3) and (4,2)). When a subscheduler grants a request, the subscheduler decrements the relevant $R_{sd}$ counter. In the next wave, this counter is used by another subscheduler that processes its own sequence of waves.

After time NT, that is, after each subscheduler is finished with its own sequence of N waves, the arbiter has produced N schedules for N slots. This improves the throughput by a factor of N over the WWFA scheme. As shown in FIG. 2, each subscheduler works to build a schedule for a different slot (i.e., a time in the future at which scheduled cells will be sent).

Parallel Wrapped Wave Front Arbiter with S<N Subschedulers

The PWWFA scheme with S=N subschedulers may experience high latency, especially when traffic is light. The reason for this is that N slots are scheduled in advance. Consider the following example that explains the worst and average latency in a lightly loaded switch.

For the purposes of illustration, in the following sections, we describe embodiments where the subschedulers start from adjacent waves. However, in some embodiments of the present invention, the subschedulers start from non-adjacent waves. For example, in an embodiment with two subschedulers, one subscheduler may start from wave 1, while another subscheduler starts from wave 3. For these embodiments there can be slight differences in the latency, but the latency is similar to embodiments that process adjacent waves.

Furthermore, in some embodiments, the subschedulers do not commence processing waves at the same time. For example, a first subscheduler can process wave 1 and commence processing wave 2. As the first subscheduler commences processing wave 2, a second subscheduler can commence processing wave 1. Alternatively, the second subscheduler may not process wave 1 until the first subscheduler has completed processing waves 1-3 and commenced processing wave 4.

Figure 3A:
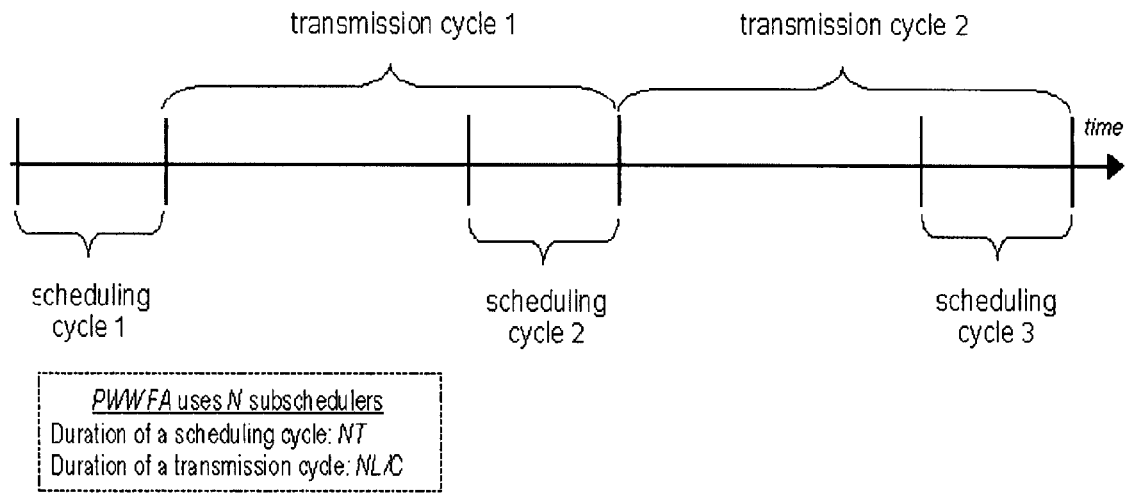
FIG. 3A illustrates a sequence of scheduling and transmission cycles using S=N subschedulers in accordance with embodiments of the present invention.

FIG. 3A illustrates a sequence of scheduling and transmission cycles using S=N subschedulers in accordance with embodiments of the present invention. During a scheduling cycle, the PWWFA produces schedules for N slots. The scheduling cycle is immediately followed by a transmission cycle during which cells are sent out according to the schedule. Shortly before the next transmission cycle starts, the scheduling cycle prepares the next N slots.

Assume that all VOQs are empty when the first scheduling cycle (see FIG. 3A) commences. When scheduling is finished, a cell arrives at one of the previously empty VOQs. The cell just missed the chance to be scheduled for the time equal to N slots, that is, N(L/C) (where L is the cell size, C is the line rate, and L/C is the time corresponding to a slot). Then, while cells are being sent to the outputs according to the N schedules during N slots, the second scheduling cycle commences. During the second scheduling cycle, the cell is scheduled, and the second cycle of sending N slots commences. In the worst-case, the cell is sent in the last slot of the second transmission cycle. Thus, a cell may suffer a worst-case delay of 2NL/C. On average, a cell arrives in the middle of the first transmission cycle and is sent out in the middle of the next transmission cycle, yielding the average delay of NL/C.

For large N, these scheduling latencies may be significant. For example, in a lightly loaded switch with N=512 ports, cell size L=128B, and line rate C=10 Gbps, the worst and average latencies are 104.86 µs and 52.43 µs, respectively.

Since the high latency is caused by many subschedulers scheduling many slots in advance, the latency may be reduced if we use fewer subschedulers. Consider the 4×4 switch depicted in FIG. 1, and assume that instead of 4 subschedulers, the PWWFA uses only 2 that start from waves 1 and 2. After each scheduling cycle, the subschedulers process the next two waves.

Figure 3B:
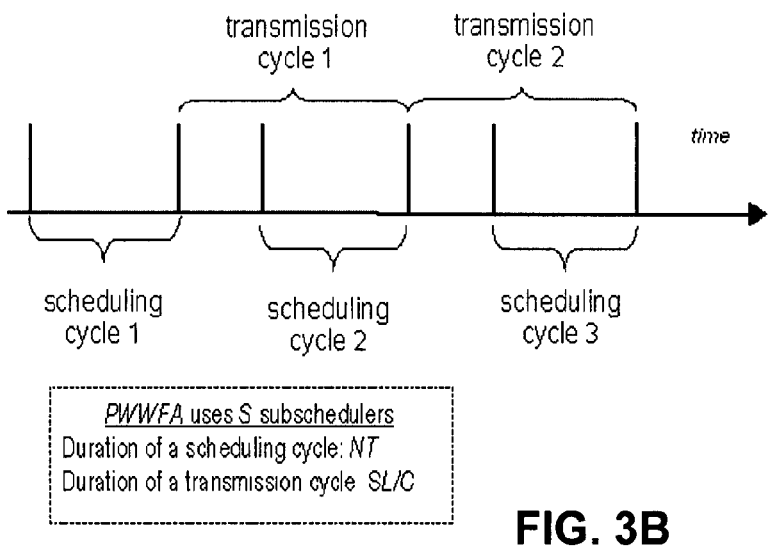
FIG. 3B illustrates a sequence of scheduling and transmission cycles using S=N/2 subschedulers in accordance with embodiments of the present invention.

FIG. 3B illustrates a sequence of scheduling and transmission cycles using S=N/2 subschedulers in accordance with embodiments of the present invention. The scheduling cycle produces S slots which are sent out in the following transmission cycle. Note that this cycle takes half of the time of the corresponding cycle in FIG. 3A. Shorter scheduling cycles can decrease the overall delays.

More specifically, the worst-case latency in a lightly loaded switch using S subschedulers is 2SL/C assuming (1) cell arrival times with a uniform distribution and (2) that subschedulers process adjacent waves (i.e., subscheduler 1 starts processing wave 1 while subscheduler 2 starts processing wave 2 and then the subschedulers proceed through the waves in order). The average latency is SL/C. (Note that in a heavily loaded switch, latencies are increased by the queuing delay.)

In some embodiments, subschedulers process waves that are not adjacent to one another. For these embodiments there can be slight differences in the latency, but the latency is similar to embodiments that process adjacent waves.

Generally, the scheduler has to keep up with the transmission rate, and should avoid scheduling too many slots in a single scheduling cycle—in other words, the number of subschedulers S should be kept as low as possible. S can be reduced until the following equation holds: $SL/C \geq NT$, where T is the time that the PWWFA takes to process one wave, and NT is the length of scheduling cycle. In other words, the S subschedulers should produce enough slots to assure that a transmission cycle is not shorter than the scheduling cycle. Otherwise, the scheduler will not operate at the line rate. Solving this equation for S, the minimum number of subschedulers is $S=NTC/L$.

The Performance of the Parallel Wrapped Wave Front Arbiter Latencies Under Light Load In the previous sections, we produced simple expressions for worst-case and average latencies in a lightly loaded switch. Let us now use these expressions in our exemplary large switch with N=512 ports, a cell size L=128B, and a line rate of C=10 Gbps. We also assume a wave period T=4 ns (which is a conservative estimate of the wave period using 90 nm chip technology). With these assumptions, the minimum number of subschedulers is S=20.

For some embodiments of the present invention, assuming that subschedulers process adjacent waves, the worst-case latency in a lightly loaded switch is 4.10 µs, and the average latency is 2.05 µs. If we use S subschedulers instead of N, we lower the latency by N/S. In this example (where S=20), assuming that subschedulers process adjacent waves, the latency can be lowered by a factor of 25.6. (Note that these latency numbers exclude delays that cells suffer waiting in queues for their turn to be scheduled.)

Simulation Results

In this section, we compare the average delay (which includes queuing delay) of two schemes: the PWWFA and the pipeline-based maximal-sized matching (PMM) scheme as described in [Rojas]. The latter is a pipelined version of iterative dual round-robin matching (iDRRM). (Note that the results of scheduling using PMM that we use below are taken from the graphs provided by [Rojas].)

Simulation results were obtained with a 95% confidence interval, not greater than 4% for the average delay. As in [Rojas], we assumed a switch with N=32 ports, a Bernoulli traffic distribution, a cell size of L=64B, and a port rate of 10 Gbps. We also assume a wave period of T=4 ns and use three subschedulers, which is the minimum number given these parameters.

We also ran simulations for bursty on-off traffic in which "on" and "off" periods are exponentially distributed. The "on" period has a mean length of 10 cells, and the mean length of the "off" period is adjusted depending on load λ as follows: $t_{off}=t_{on} \times (1-\lambda)/\lambda$.

Figure 4:
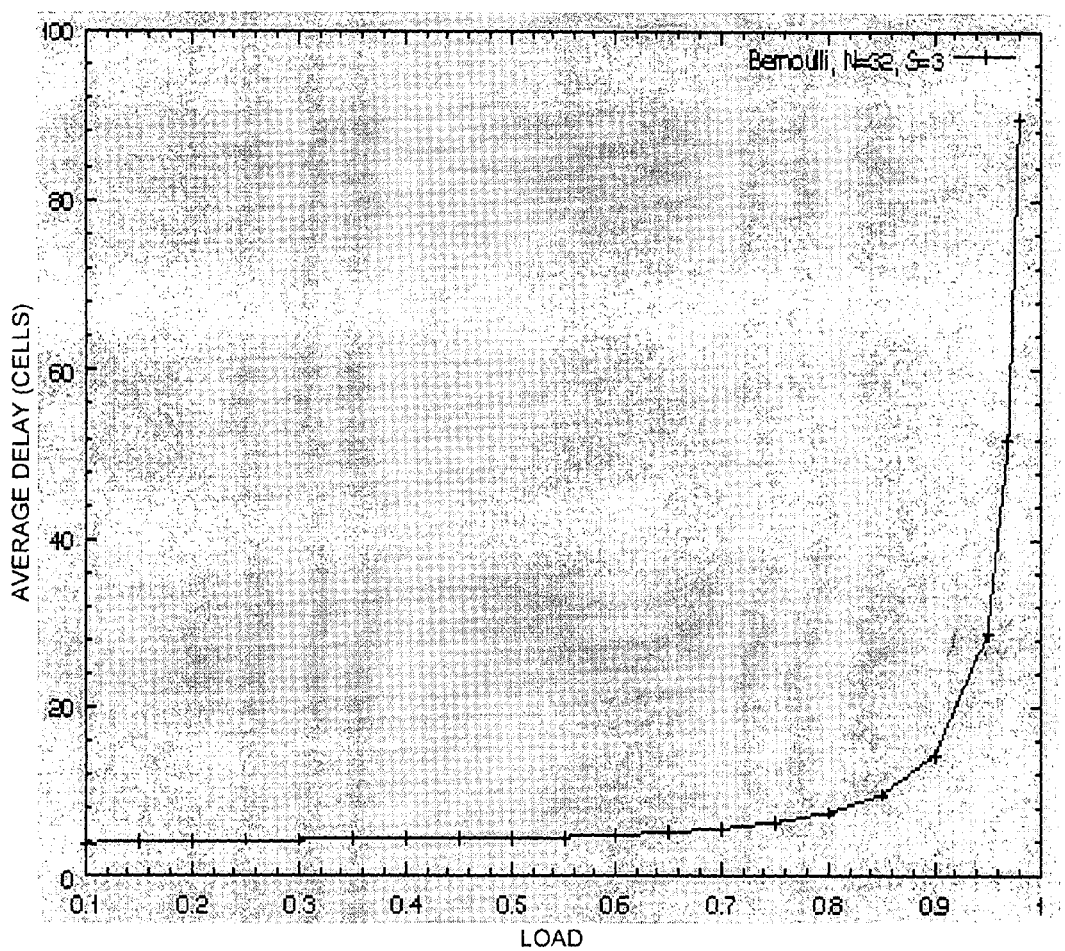
FIG. 4 presents a graph illustrating average delay versus load for a switch with 32 ports assuming a Bernoulli distribution of network traffic in accordance with embodiments of the present invention.
Figure 5:
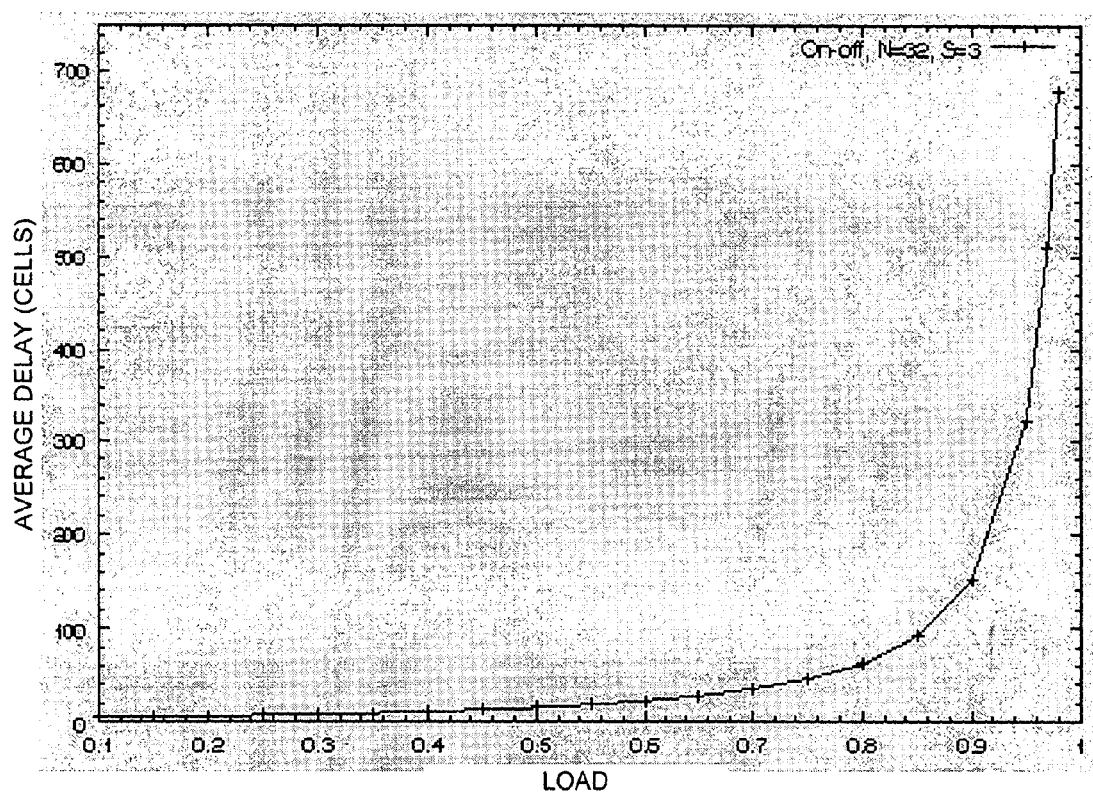
FIG. 5 presents a graph illustrating average delay versus load for a switch with 32 ports assuming on-off network traffic in accordance with embodiments of the present invention.

FIG. 4 presents a graph illustrating the delay versus load for Bernoulli-distributed traffic across a 32-port switch using S=3 subschedulers in accordance with embodiments of the present invention. FIG. 5 presents a graph illustrating the delay versus load for on-off traffic across a 32-port switch using S=3 subschedulers in accordance with embodiments of the present invention. In both graphs, we assume that the subschedulers process adjacent waves. Note that the delay is given in cell times (slots). When compared with results published in [Rojas], the PWWFA offers lower delays. For example, for a load of 0.95, scheduling using the PWWFA results in a delay of 28 cell times, while PMM's delay (for 3 subschedulers and 4 iterations of pipelined iDRRM) is higher by about a factor of two. Results for on-off traffic show similar relations.

Figure 6:
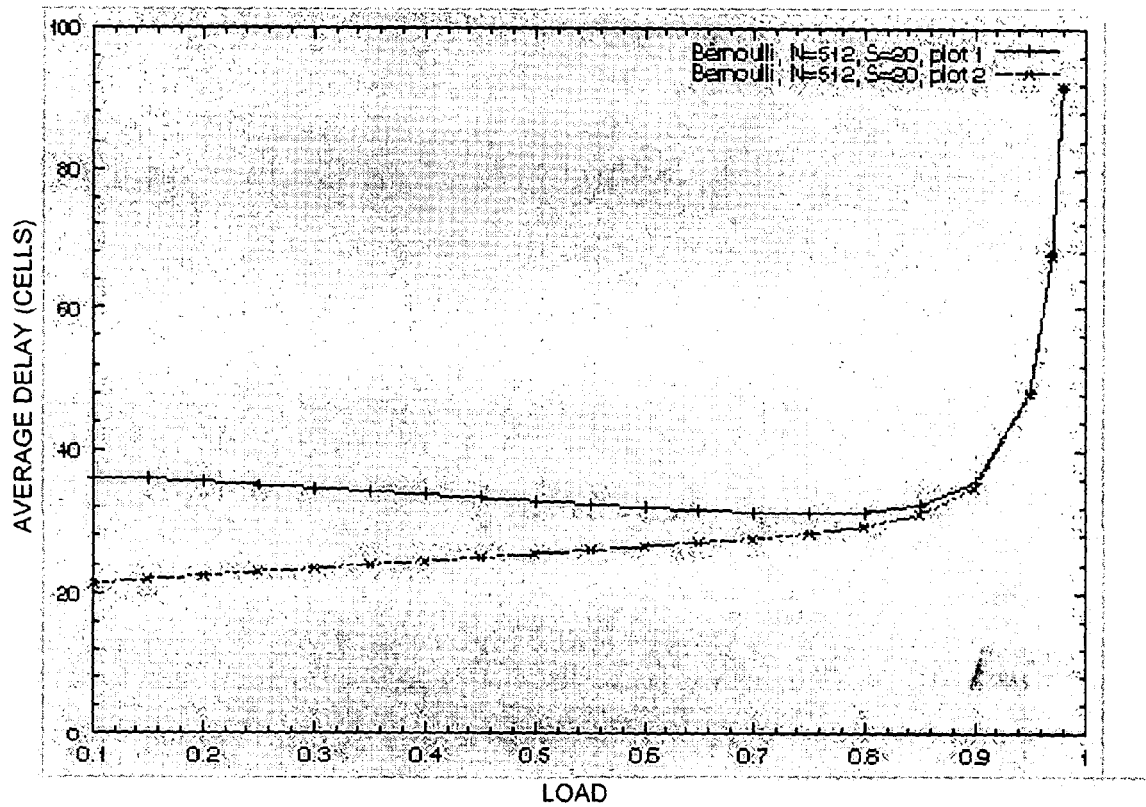
FIG. 6 presents a graph illustrating average delay versus load for a switch with 512 ports assuming a Bernoulli distribution of network traffic in accordance with embodiments of the present invention.

FIG. 6 presents a graph that illustrates two plots of average delays in a 512-port switch in which the PWWFA runs 20 subschedulers in accordance with embodiments of the present invention. Again, we assume that the subschedulers process adjacent waves. As shown in FIG. 6, the delays are reasonable considering the large size of the switch. They range from 36 cell times for low loads up to just 92 cell times for high loads. Assuming a cell of size 128B and a date rate of 10 Gbps, this translates to average delays in the range from 3.7 µs to 9.4 µs.

Although we describe embodiments that process adjacent waves, in some embodiments, subschedulers process waves that are not adjacent to one another (i.e., subscheduler 1 starts processing wave 1 while subscheduler 2 starts processing wave 3). For these embodiments there can be slight differences in the latency, but the latency is similar to embodiments that process adjacent waves.

Effect of Schedule Ordering on Latencies

When cells are sent using the schedules produced by the subschedulers where the cells are ordered according to schedule from schedule 1 to schedule S (see plot 1 in FIG. 6), in a certain range of loads, average delays are actually higher when loads are low. However, when cells are sent using the schedules in the reverse order (see plot 2 in FIG. 6), the average delays are lower. The following paragraphs explain this behavior of the PWWFA.

Note that the latencies described in the following section were calculated using subschedulers starting from adjacent waves. In some embodiments, subschedulers process non-adjacent waves. For these embodiments there can be slight differences in the latency, but the latency is similar to embodiments that process adjacent waves.

In the PWWFA, each of the S subschedulers processes its own first wave of transfer elements. Some requests are granted. In the next wave, subscheduler 1 processes the elements that were just processed by subscheduler 2 in the previous wave, subscheduler 2 processes elements just processed by subscheduler 3, etc. In other words, subscheduler k processes waves of elements just processed by subscheduler k+1. In this scheme, subscheduler 1 is out in front, processing elements not yet processed by the other subschedulers.

If the load is light, most elements have only one request. Consequently, subscheduler S is likely to process the largest number of requests. Therefore, the elements first processed by S are more likely to have their requests granted before the other subschedulers get to these elements.

So, we can expect that under a light load, subscheduler 1 processes the lowest number of requests because subscheduler 1 is preceded by S-1 subschedulers. In other words, the schedule produced by subscheduler 1 will contain fewer grants (i.e., the schedule will have the lowest number of matched pairs of inputs and outputs). Every consecutive subscheduler will produce schedules with more grants. The question that arises is how this affects delays.

In the simulations used to obtain plot 1 in FIG. 6, cells are sent out in the order in which they are matched by subschedulers. This means that cells matched by subscheduler 1 experience lower delays than higher-numbered subschedulers (that match more cells than lower-numbered subschedulers).

So, there are relatively few cells that have low delays, and many cells that have long delays. If the load increases, more elements have requests. This means that higher-numbered subschedulers will be less likely to match all requests, and sizes of the schedules will be more evenly distributed. As a result, more cells will experience lower delays. This larger number of low-delay cells will make up for the high-delay cells sent in slots produced by higher numbered subschedulers. This leads to a lower average delay.

Of course, for sufficiently high loads, queuing delay becomes a dominant factor, and the above-described phenomenon loses its effect on the average delays. Two factors that diminish this effect are: (1) a small number of inputs and outputs N; and (2) a large ratio of S/N indicating that first waves of S subschedulers cover a large portion of the PWWFA matrix. In fact, (1) and (2) are related. A small N can lead to lower S but since S drops slower than N, the ratio S/N effectively increases. For example, for N=32 inputs, the minimum number of subschedulers S=3, and ratio S/N=0.09. For N=512, S=20, and S/N=0.04. Hence, with small N and large S/N, higher-numbered subschedulers are less likely to grant to most requests because there are relatively few elements ahead of the subscheduler S not covered by the first waves of the remaining S−1 subschedulers. In effect, the grants are more evenly distributed among the subschedulers, the schedules have fewer grants, and they are less affected by increasing loads. This results in an average load that behaves as we would expect—the average delay grows with increasing load.

A Large Switch Application of the Parallel Wrapped Wave Front Arbiter

To appreciate the benefits of PWWFA in the context of large switches, let us compare PWWFA with WWFA, using the parameters of a large 512-port switch given above. In WWFA, the scheduling period has a length of NT. Since at least one schedule has to be calculated in every slot, NT must be no greater than L/C. This means that $T \leq L/(NC)=0.2$ ns. In other words, the arbiter must process one wave that includes N requests in no more than 0.2 ns. A reasonable hardware implementation of transfer elements based on 90 nm technology would require at least T=2 ns per wave.

Given a PWWFA with N subschedulers, N schedules are ready in time NT. This means that schedules are produced at rate of 1/T. The time T can be no greater than the period of the slot L/C, that is, $T \leq L/C$. Using the above values, $T \leq 102.4$ ns, which is within the performance limits of 90 nm circuitry.

As we have shown above, keeping the number S of subschedulers as small as possible can be beneficial. Thus, knowing the switch parameters and hardware limitations (T=4 ns per wave), we can calculate the minimum S which assures that a scheduling cycle is shorter than a transmission cycle and that a switch can operate at the line rate.

Implementation and Classes of Service

Embodiments of the present invention provide a register with logic that increments the request counter as requests arrive and that decrements the request counter as requests are serviced. The rules described above can be represented by signals passed from one element of the arbiter's matrix to the other. For example, if a request is granted, the associated element sends a signal to its neighboring elements, which prevents a possible request in these elements from being granted.

Classes of Service

Embodiments of the present invention implement classes of service in the PWWFA. Consider a switch that deals with w priorities. Every input port has N VOQs for the traffic of each priority. As described above, every element of the PWWFA matrix corresponds to a single $VOQ_{ds}$. A positive request counter $R_{sd}$ indicates that $VOQ_{ds}$ is non-empty. On the other hand, with w priorities, an element of a PWWFA matrix has w credit counters: $R_{sd1}, R_{sd2} \ldots R_{sdw}$ that reflect occupancies in a corresponding set of priority VOQs. For example, $R_{sd1}$ stores the occupancy of $VOQ_{ds1}$, that is, a priority 1 VOQ at input port s with cells for output port d. During the scheduling cycle, a given subscheduler checks the values of the credit counters in a descending order of priorities. A cell represented by the first positive credit counter will be scheduled for transfer (subject to other PWWFA rules described above).

To avoid a possible starvation of low-priority traffic, embodiments of the PWWFA use weights to arbitrate between the credit counters. In other words, a more fully-loaded VOQ can take precedence, despite having a lower priority.

Transfer Scheduling Process

Figure 7:
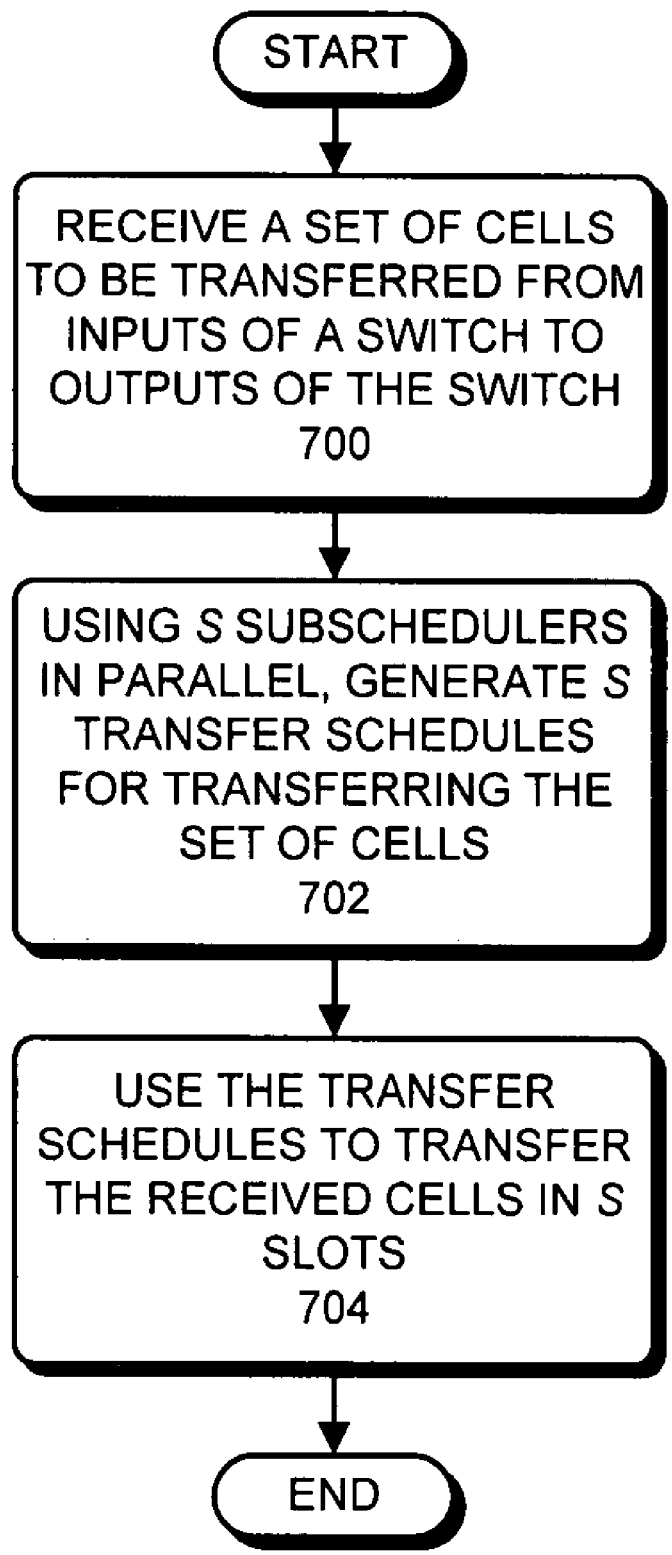
FIG. 7 presents a flowchart illustrating the process of scheduling a transfer in accordance with embodiments of the present invention.

FIG. 7 presents a flowchart illustrating the process of scheduling a transfer in accordance with embodiments of the present invention. The process starts when the system receives a set of cells to be transferred from the inputs of a switch to the outputs of the switch (step 700).

Note that in some embodiments of the present invention, cells arrive at the inputs asynchronously (i.e., cells can arrive at the inputs at any time). Each scheduling cycle then schedules the cells that have arrived prior to the commencements of the scheduling cycle (including cells that arrived before prior scheduling cycles but were unable to be scheduled because another cell was scheduled for the output).

The system then uses S subschedulers in parallel to generate S transfer schedules for transferring the set of cells (step 702). While generating the transfer schedules, each subscheduler processes a sequence of predefined waves within a matrix of transfer elements within the switch. Each wave includes a subset of the matrix of transfer elements for which simultaneous conflict-free input-to-output transfers can be scheduled. Note that each subscheduler starts from a different wave when producing a schedule.

In some embodiments, the matrix of transfer elements may be updated with new requests in parallel with processing waves.

Next, the system uses the transfer schedules to transfer the received cells in S slots (step 704). In other words, in each of S sequential slots, the system transfers cells from the inputs of the switch to the outputs of the switch according to one of the transfer schedules.

Output Enable

Some embodiments of the present invention include an output enable. To avoid overflowing an output, these embodiments assert the output enable signal to the scheduler to halt the scheduling of cells for the output.

In some embodiments of the present invention, the output enable is credit-based. In other embodiments, the flow control is xon/xoff.

Circuits

Figure 8:
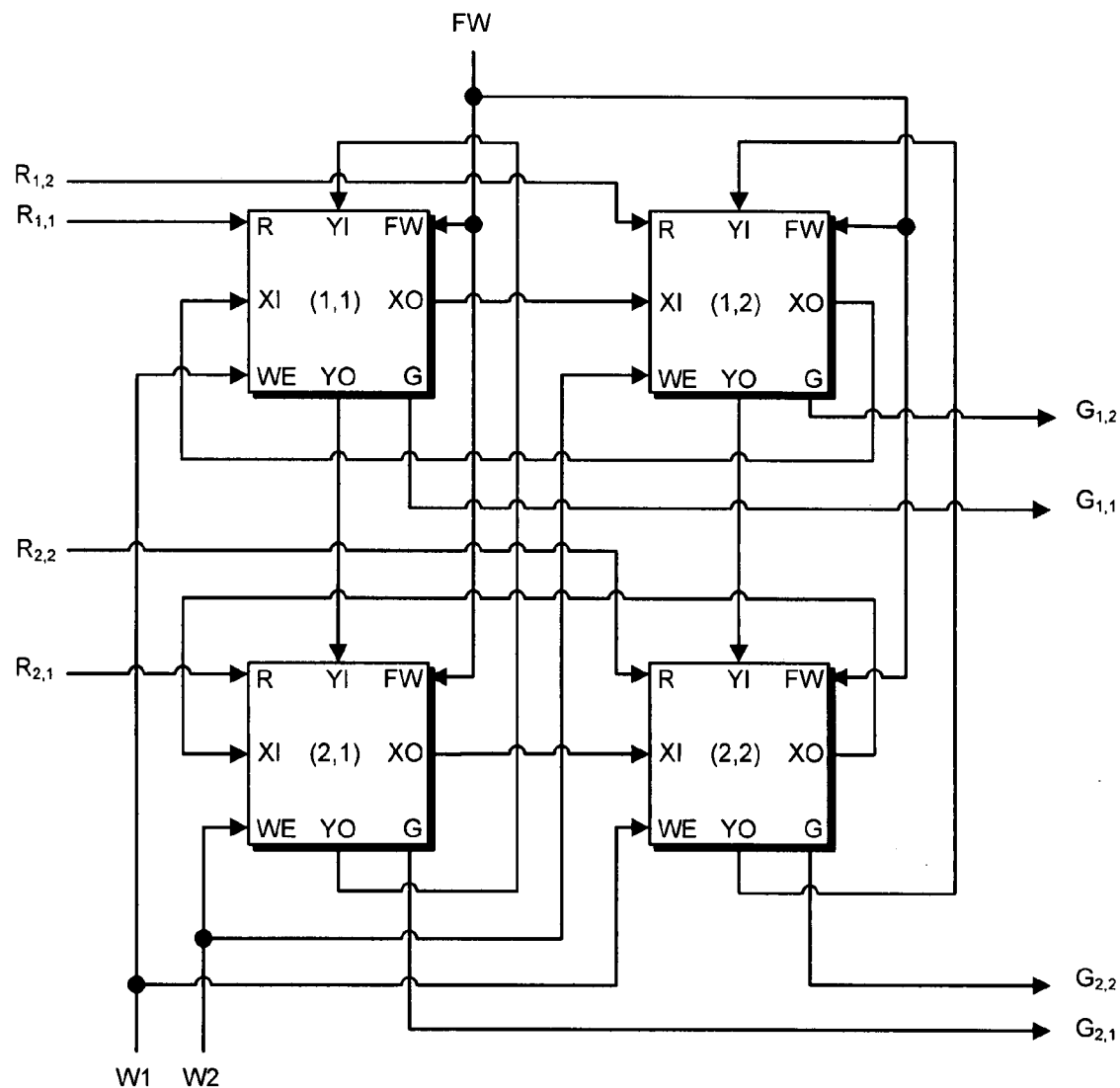
FIG. 8 presents a block diagram of a matrix of transfer elements in accordance with embodiments of the present invention.

FIG. 8 presents a block diagram of a matrix of transfer elements in accordance with embodiments of the present invention. The matrix of transfer elements includes transfer elements used by the PWWFA to process output requests and grants. For purposes of illustration, we assume that the PWWFA uses two processing waves. One processing wave includes transfer elements (1,1) and (2,2), while the other processing wave includes transfer elements (1,2) and (2,1). The inputs of the transfer elements include XI/YI, R, FW, and WE, while the outputs include XO/YO, and G.

$R_{i,o}$ and $G_{i,o}$ are request and grant signals, respectively. The request signal $R_{i,o}$ is asserted for a given transfer element when a cell is received at input i and is to be transferred to output o. For example, request signal $R_{1,2}$ is asserted when a cell needs to be transferred from input 1 to output 2. On the other hand, the grant signal $G_{i,o}$ is asserted when the transfer request from input i to output o is granted.

XO (row enable out) and YO (column enable out) are asserted by a transfer element to signal neighboring elements that no transfer request has yet been granted in the same row or column, respectively. A transfer element deasserts XO and YO when the transfer element grants a transfer request to prevent elements in the same row or column from granting conflicting transfers. XO is deasserted either if the corresponding transfer element grants a request or if a previous transfer element in the same row granted a request. YO is deasserted either if the corresponding transfer element grants a request or if a previous transfer element in the same column granted a request.

XO and YO are passed on to neighboring elements through their XI/YI (row enable in/column enable in) inputs. When a neighboring transfer element sees a deasserted XI signal, the neighboring transfer element does not grant a transfer request and deasserts XO. Likewise, when a neighboring transfer element sees a deasserted YI signal, the neighboring transfer element does not grant a transfer request and deasserts YO.

The FW signal (first wave signal) is asserted to signal the transfer elements to start processing a new schedule. The FW signal overrides the XI and YI signals such that the transfer elements grant transfer requests independent of XI and YI and thus ignore all grants given in previous schedules. While FIG. 8 shows one FW signal connected to all transfer elements, in some embodiments there may be separate FW signals coupled to transfer elements of different waves. With separate FW signals, these embodiments can selectively signal the transfer elements in specific waves to start processing a new schedule.

The WE signal is the wave enable signal. When the WE signal is asserted, the receiving transfer element processes an outstanding request (if one is available for the transfer element). The WE signal can be used to implement subschedulers by selectively enabling only a subset of the waves in the matrix of transfer elements.

Figure 9:
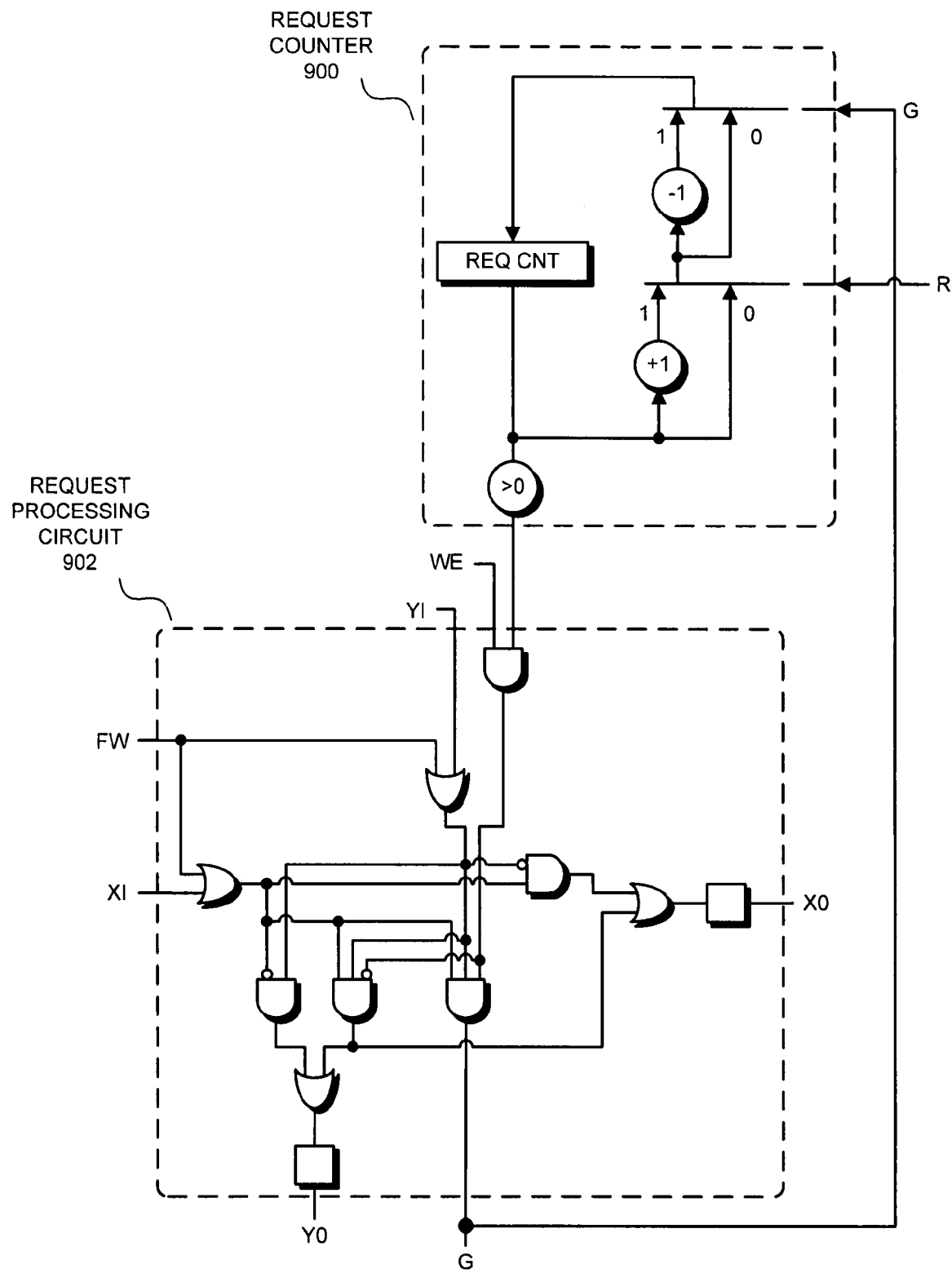
FIG. 9 presents a schematic diagram of a transfer element from a PWWFA in accordance with embodiments of the present invention.

FIG. 9 presents a schematic diagram of a transfer element from a PWWFA in accordance with embodiments of the present invention. Each transfer element includes circuit structures for tracking the count of requests that are awaiting grants from the transfer element (request counter 900) and circuit structures for processing requests (request processing circuit 902).

Request counter (REQ CNT) is incremented when request signal R is asserted and it is decremented when grant signal G is asserted. Grant signal G is asserted only if: (1) the transfer elements has requests (i.e., REQ CNT>0); (2) wave enable signal WE is asserted; and (3) either FW is asserted or both XI and YI are asserted. Row enable out signals XO and YO are asserted or deasserted as described above. In some embodiments, XO and YO are registered to allow for pipelined operation of the arbiter.

In some embodiments, the PWWFA matrix is implemented in synchronous digital logic. Referring to FIG. 8, each wave processes its transfer requests in one clock cycle based on request counts REQ CNT and signals XI, YI, WE, and FW. The waves compute grant signals G and row and column enables XO and YO, where XO and YO are passed on to the next wave for the next clock cycle. A PWWFA with N waves with N elements each can thus calculate N schedules in parallel in N clock cycles.

Figure 10:
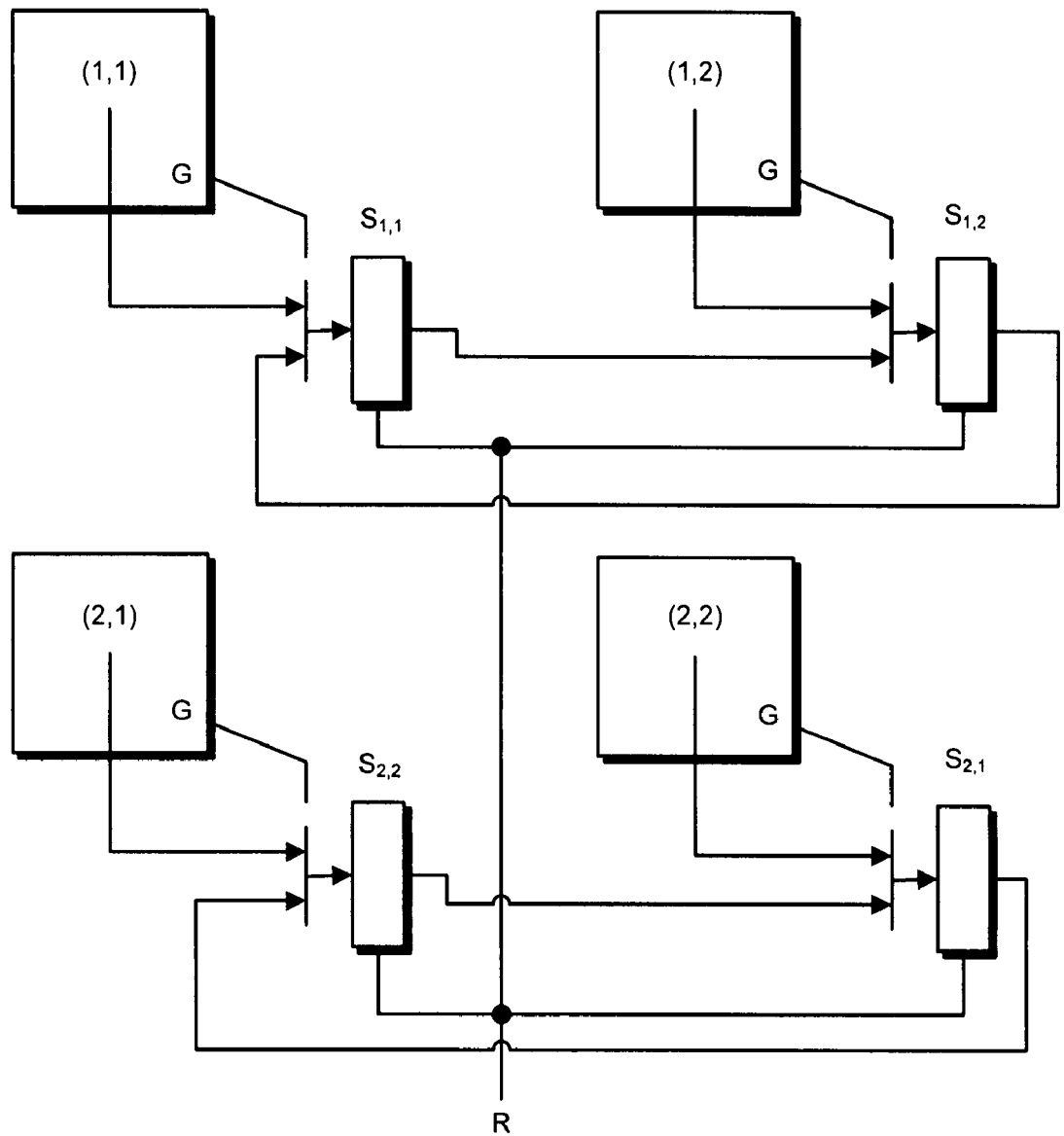
FIG. 10 presents a block diagram of grant registers within a PWWFA in accordance with embodiments of the present invention.

FIG. 10 presents a block diagram of grant registers within a PWWFA in accordance with embodiments of the present invention. The grant registers allow the switch to determine which inputs have granted requests. The grant registers are named $S_{i,j}$ according to the input port and the slot. For example, $S_{2,1}$ is the grant register for input port 2 in slot 1.

Grant registers $S_{i,j}$ for the same input i are connected to implement a shift register. During the computation of a schedule, this shift register is used to record grants from all transfer elements serving input i. For example, to compute a new schedule for slot 1, grant registers $S_{1,1}$ and $S_{2,1}$ are first set to zero using signal R. In the first processing cycle, wave 1 including elements (1,1) and (2,2) is processed. If element (1,1) grants a transfer request in this cycle, it overwrites the zero value in $S_{1,1}$ with the value of the granted output. Similarly, if element (2,2) grants a transfer request in this cycle, it overwrites the zero value in $S_{2,1}$ with the value of the granted output. The values of $S_{1,1}$ and $S_{2,1}$ are then passed on to registers $S_{1,2}$ and $S_{2,2}$, respectively, for the next processing cycle. In the next processing cycle, wave 2 including elements (1,2) and (2,1) is processed. If element (1,2) grants a transfer requests in this cycle, it overwrites the value in $S_{1,2}$ with the value of the granted output. Similarly, if element (2,1) grants a transfer request in this cycle, it overwrites the value in $S_{2,2}$ with the value of the granted output. The values of $S_{1,2}$ and $S_{2,2}$ are then passed on to registers $S_{1,1}$ and $S_{2,1}$, respectively. Grant registers $S_{1,1}$ and $S_{2,1}$ now contain the values of the granted outputs for inputs 1 and 2, respectively, or zero if no grant was given.

While FIG. 10 shows one reset signal R connected to all grant registers, in some embodiments, there are multiple reset signals connecting to grant registers of different slots to selectively reset grant registers for particular slots.

Figure 11:
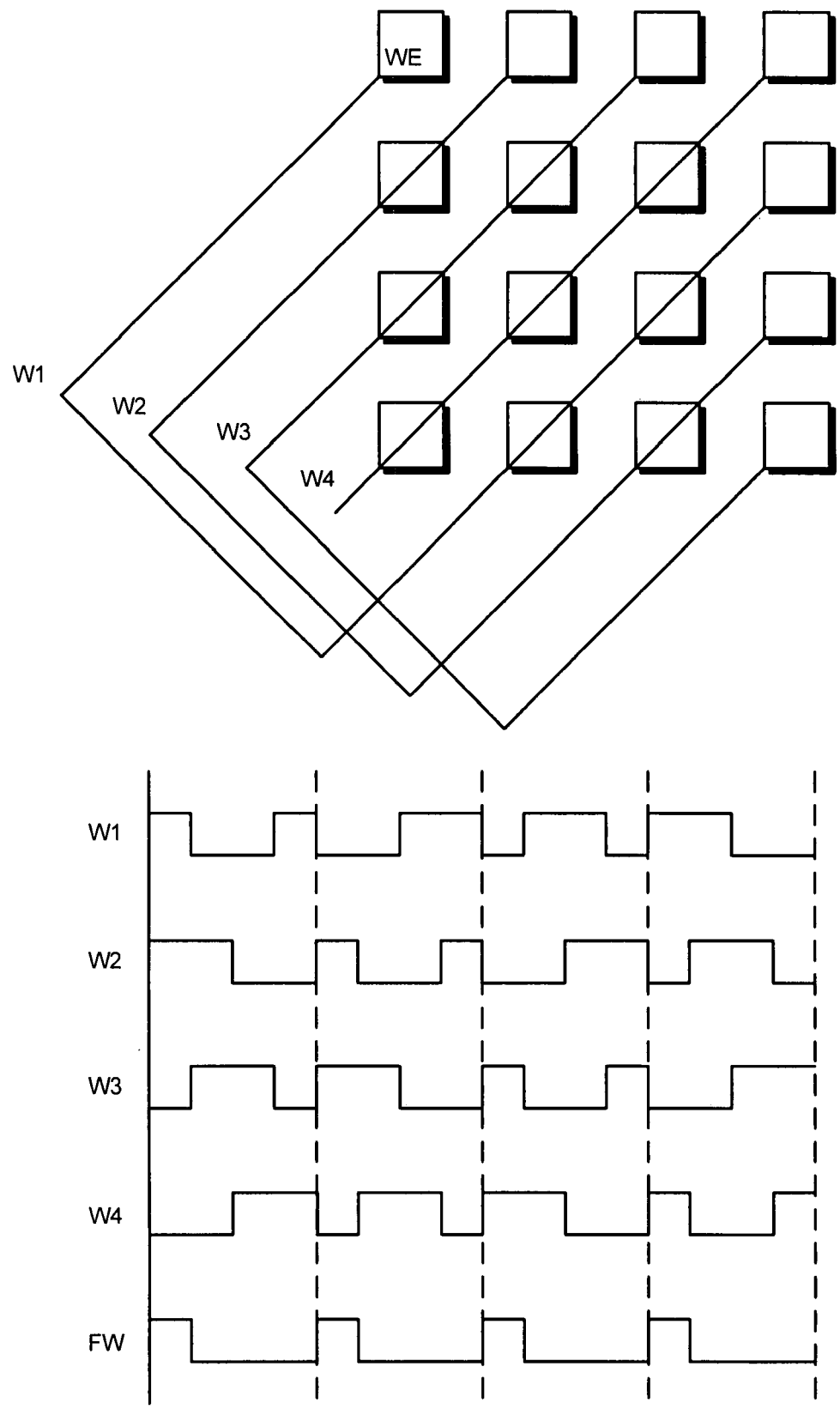
FIG. 11 presents a timing diagram for a PWWFA with 2 sub-schedulers in accordance with embodiments of the present invention.

FIG. 11 presents a timing diagram for a 4×4 switch with 2 subschedulers in accordance with embodiments of the present invention. Each waveform illustrates how the wave enable (WE) signals are asserted for the elements corresponding to a given wave while processing requests during a scheduling cycle. The FW waveform illustrates how the first wave signal is asserted while processing requests.

In the first scheduling cycle, FW is asserted to signal both subschedulers to start processing a new schedule. In the same cycle, wave enable signals W1 and W2 are asserted corresponding to subscheduler 1 processing wave 1 and subscheduler 2 processing wave 2. In the second cycle, FW is deasserted and subschedulers 1 and 2 progress to waves 2 and 3, respectively, as indicated by asserted signals W2 and W3. In cycles 3 and 4, subschedulers 1 and 2 process waves 3 and 4 and waves 4 and 1, respectively.

Cycles 1, 5, 9, and 13 each show the start of a new schedule as indicated by signal FW. In each of these cycles, subschedulers 1 and 2 start with different waves to address fairness issues as described above.

Alternative Embodiments

Although we describe embodiments of the present invention that are used to schedule the transfer of cells from the inputs to the outputs of a switch, alternative embodiments are used to schedule the transfer of cells within a switch. For example, some embodiments are used to schedule the transfer of cells from the inputs of a switch to intermediate buffers within the switch.

In addition, other embodiments are envisioned wherein the PWWFA is used to schedule other computer system activities. For example, in some embodiments, the PWWFA is used to schedule the transfer of data, such as scheduling cache accesses or scheduling data transfers using a bus. In other embodiments, the PWWFA is used to schedule the allocation of resources in a computer system, such as scheduling the use of processors by threads in a multi-processor computer system or the use of peripheral devices.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for scheduling the transfer of cells in a switch, comprising:
   receiving a set of cells to be transferred from a set of inputs of the switch to a set of outputs of the switch;
   wherein the switch includes S subschedulers, wherein each subscheduler processes N scheduling waves to generate a conflict-free transfer schedule for a given time slot for a matrix of transfer elements in the switch, wherein each transfer element in the matrix of transfer elements includes one or more circuit elements that facilitate generating S transfer schedules in parallel;
   operating the subschedulers in parallel to generate S transfer schedules for transferring the cells from the set of inputs of the switch to the set of outputs of the switch during S time slots;
   wherein when generating the transfer schedules, each subscheduler processes each different scheduling wave only once, wherein each subscheduler processes a scheduling wave in time T, and wherein the N scheduling waves are processed in time NT to generate the conflict-free transfer schedule; and
   for each transfer schedule in the S transfer schedules, performing a set of input-to-output transfers for one time slot using the transfer schedule, wherein performing the set of input-to-output transfers comprises using the transfer schedules in a reverse order from the order the transfer schedules are generated.

2. The method of claim 1, wherein in the matrix of transfer elements each transfer element controls the coupling of one individual input from the set of inputs to one individual output from the set of outputs.

3. The method of claim 2, wherein each scheduling wave includes a subset of the matrix of transfer elements for which simultaneous conflict-free input-to-output transfers can be scheduled.

4. The method of claim 3, wherein when generating the transfer schedules, the method further comprises starting each subscheduler from a different scheduling wave among the N scheduling waves.

5. The method of claim 2, wherein each transfer element is coupled to a separate virtual output queue (VOQ), wherein the method further comprises storing cells in the VOQ before transferring the cells to the corresponding output.

6. The method of claim 5, wherein each transfer element includes a counter value associated with the corresponding VOQ, wherein the method further comprises:
   incrementing the counter value when a cell is stored in the VOQ;
   decrementing the counter value as a transfer is scheduled from the VOQ to the corresponding output; and
   scheduling a transfer from the VOQ to the corresponding output only if the counter value is non-zero.

7. The method of claim 2, wherein each transfer element is coupled to a separate set of two or more priority VOQs, wherein the method further comprises storing cells in a selected priority VOQ according to a priority indicated by the cell before transferring the cells to the corresponding output.

8. The method of claim 7, wherein each transfer element includes a counter value associated with each of the corresponding priority VOQs, wherein the method further comprises:
   incrementing the corresponding counter value when a cell is stored in a priority VOQ;
   decrementing the corresponding counter value as a transfer is scheduled from a priority VOQ to the corresponding output; and
   scheduling a transfer from a priority VOQ to the corresponding output only if the corresponding counter value is non-zero.

9. The method of claim 7, wherein the method further comprises preferentially scheduling transfers to the corresponding output from a higher-priority priority VOQ.

10. The method of claim 1, wherein the number of subschedulers S is equal to or less than the number of scheduling waves N.

11. An apparatus for scheduling the transfer of cells in a switch, comprising:
    a transferring mechanism configured to receive a set of cells to be transferred from a set of inputs of the switch to a set of outputs of the switch, wherein the transferring mechanism comprises a matrix of transfer elements;
    a scheduling mechanism that includes S subschedulers, wherein each subscheduler processes N scheduling waves in sequence to generate a conflict-free transfer schedule for a given time slot for the matrix of transfer elements in the switch, wherein each transfer element in the matrix of transfer elements includes one or more circuit elements that facilitate generating S transfer schedules in parallel; and
    wherein the scheduling mechanism is configured to operate the subschedulers in parallel to generate S transfer schedules to transfer the cells from the set of inputs of the switch to the set of outputs of the switch during S time slots;
    wherein when generating the transfer schedules, each subscheduler processes each different scheduling wave only once, wherein each subscheduler processes a scheduling wave in time T, and wherein the N scheduling waves are processed in time NT to generate the conflict-free transfer schedule;
    wherein for each transfer schedule in the S transfer schedules, the transferring mechanism is configured to perform a set of input-to-output transfers for one time slot using the transfer schedule, wherein while performing the set of input-to-output transfers, the transferring mechanism is configured to use the transfer schedules in a reverse order from the order the transfer schedules are generated.

12. The apparatus of claim 11, wherein in the matrix of transfer elements each transfer element controls the coupling of one individual input from the set of inputs to one individual output from the set of outputs.

13. The apparatus of claim 12, wherein each scheduling wave includes a subset of the matrix of transfer elements for which simultaneous conflict-free input-to-output transfers can be scheduled.

14. The apparatus of claim 13, wherein, when generating the transfer schedules, the scheduling mechanism starts each subscheduler from a different scheduling wave among the N scheduling waves.

15. The apparatus of claim 12, wherein each transfer element is coupled to a separate virtual output queue (VOQ), wherein the transferring mechanism stores cells in the VOQ before transferring the cells to the corresponding output.

16. The apparatus of claim 15, wherein each transfer element includes a counter value associated with the corresponding VOQ;
   wherein the transferring mechanism is configured to increment the counter value when a cell is stored in the VOQ;
   wherein the subschedulers are configured to decrement the counter value as a transfer is scheduled from the VOQ to the corresponding output; and
   wherein the subschedulers are configured to schedule a transfer from the VOQ to the corresponding output only if the counter value is non-zero.

17. The apparatus of claim 12, wherein each transfer element is coupled to a separate set of two or more priority VOQs, wherein the transferring mechanism stores cells in a selected priority VOQ according to a priority indicated by the cell before transferring the cells to the corresponding output.

18. The apparatus of claim 17, wherein each transfer element includes a counter value associated with each of the corresponding priority VOQs;
   wherein the transferring mechanism is configured to increment the corresponding counter value when a cell is stored in a priority VOQ;
   wherein the subschedulers are configured to decrement the corresponding counter value as a transfer is scheduled from a priority VOQ to the corresponding output; and
   wherein the subschedulers are configured to schedule a transfer from a priority VOQ to the corresponding output only if the corresponding counter value is non-zero.

19. The apparatus of claim 17, wherein the subschedulers are configured to preferentially schedule transfers to the corresponding output from a higher-priority priority VOQ.

20. The apparatus of claim 11, wherein the number of subschedulers S is equal to or less than the number of scheduling waves N.

21. A method of sharing multiple resources among multiple requesters using an arbiter, comprising:
   receiving requests for the multiple resources from the multiple requesters, wherein each resource includes one or more circuit elements that facilitate generating S resource allocation schedules in parallel;
   using S subschedulers in parallel to generate resource allocation schedules for the requests for S time slots, wherein each subscheduler uses N scheduling waves;
   allocating at least some of the resources in S time slots according to the S resource allocation schedules; and
   in each scheduling cycle, processing the requests using the N scheduling waves in a reverse order from the order the resource allocation schedules are generated;
   wherein when generating the resource allocation schedules, each subscheduler processes each different scheduling wave only once, wherein each subscheduler processes a scheduling wave in time T, and wherein the N scheduling waves are processed in time NT to generate a conflict-free transfer schedule.

22. The method of claim 21, wherein each scheduling wave includes a subset of the set of all pairs of an individual requester and an individual resource for which simultaneous conflict-free allocation can be scheduled.

23. The method of claim 22, wherein the number of subschedulers S is equal to or less than the number of scheduling waves N.

24. The method of claim 23, wherein the method further comprises starting each subscheduler from a different scheduling wave among the N scheduling waves.

* * * * *